United States Patent

[11] 3,568,028

| [72] | Inventor | Leo J. Veillette<br>Lanham, Md. |
| --- | --- | --- |
| [21] | Appl. No. | 808,462 |
| [22] | Filed | Mar. 19, 1969 |
| [45] | Patented | Mar. 2, 1971 |
| [73] | Assignee | the United States of America as represented by the Administrator of the National Aeronautics and Space Administration |

[54] SYNCHRONOUS/DC DIRECT-DRIVE SYSTEM
14 Claims, 12 Drawing Figs.

| [52] | U.S. Cl. | 318/571, 318/653 |
| --- | --- | --- |
| [51] | Int. Cl. | G05b 19/24 |
| [50] | Field of Search | 318/20.110, 20.704 |

[56] References Cited
UNITED STATES PATENTS

| 3,011,113 | 11/1961 | Jerue et al. | 318/467(20.704) |
| --- | --- | --- | --- |
| 3,206,663 | 9/1965 | Neal et al. | 318/18(20.110) |
| 3,414,787 | 12/1968 | Reuteler et al. | 318/30X(20.110) |
| 3,443,178 | 5/1969 | Reuteler | 318/18(20.110) |

*Primary Examiner*—Benjamin Dobeck
*Attorney*—R. F. Kempf, E. Levy and G. T. McCoy ABSTRACT: A multiple-loop hybrid control system for controlling a load, which is directly connected to an actuator includes an offset-tooth magnetic sensor which senses output shaft movement and generates position and rate information needed for system control. A command waveforms generator provides command and comparison signals that are compared with the processed magnetic sensor information in suitable electronic comparing loops. The output signals from the electronic comparing loops are utilized to control the movement of the actuator and load.

INVENTOR
Leo J. Veillette
BY
ATTORNEYS

SYNCHRONOUS/DC DIRECT-DRIVE SYSTEM

ORIGIN OF THE INVENTION

The invention described herein was made by an employee of the United States government and may be manufactured and used by or for the government for governmental purposes without the payment of any royalties thereon or therefor.

BACKGROUND OF THE INVENTION

It has been found in some environments that it is desirable and often essential, to eliminate interconnecting mechanical elements normally located between an actuator, such as a brushless DC motor, and a mechanically driven load. However, these "direct-drive systems" impose certain limitations on system performance characteristics. For example, the systems have limited low-speed capability, since the output shaft speed of the actuator cannot be reduced by a stepdown gearing or other mechanical means. Further, these systems have low mechanical stiffness or high mechanical impedance at the output shaft, since the transformation properties of stepdown gearing are not available to increase the stiffness or reduce the impedance of the drive source. In addition, these systems have negligible electrical damping, since the transformation properties of stepdown gearing are not available to increase the effective damping reflected to the output shaft. Moreover, these systems have reduced angular resolution and rate sensitivity reflected to the output shaft position and rate sensors, since angular displacement and speed cannot be reduced by stepdown gearing. Hence, the elimination of the mechanical interconnection system, which is usually stepdown gearing, results in certain problems which limit system performance.

Prior art direct-drive systems have to some extent overcome some, but not all, of the foregoing problems and, in many cases, the required system mechanization has introduced additional undesirable features. For example, very low-speed direct-drive capability has been achieved by using a synchronous actuator driven from a very low frequency two-phase source, resulting in a system that has low-speed capability. However, because the synchronous actuator has limited mechanical stiffness and is coupled directly to the output shaft, the system possesses undesirable drive characteristics. In addition, the synchronous drive actuator requires continuous full-rated power and has, essentially, no electrical damping. While mechanical losses may be employed in this system for damping, these losses have an unpredictable character, particularly when the system is to be operated over long periods of time under severe environmental conditions, such as on a space vehicle, for example.

The prior art has attempted to achieve open-loop direct-drive control down to orbital rates by using a DC pancake tachometer in a rate feedback system. However, these attempts have resulted in systems having extreme sensitivity to environmental noise. In addition, the components forming such a system have been of considerable size and weight. Hence, the systems resulting from these attempts have been entirely unsatisfactory for most practical applications.

In addition to the foregoing disadvantages, prior art attempts at direct-drive systems have been limited by one or more of the following: inadequate angular resolution; restricted operating range; excessive nonlinearity; limited life and reliability; unstable component parameters; excessive complexity, and other similar disadvantages.

Therefore, it is an object of this invention to provide a new and improved direct-drive system.

It is also an object of this invention to provide a control system for controlling a load directly connected to an actuator.

It is a still further object of this invention to provide a system for controlling a brushless DC motor directly connected to a load without interconnecting gearing or other mechanical elements.

It is a still further object of this invention to provide a system for controlling a load directly connected to an actuator that has indefinitely low-speed capabilities, high mechanical stiffness, adequate electrical damping, adequate angular resolution and rate sensitivity, and operates smoothly and continuously under general conditions of load and running speed.

It is a still further object of this invention to provide a control system for controlling a load directly connected to an actuator that is uncomplicated and of relatively small size and weight, thereby making the system suitable for use in remote environments.

It is yet another object of this invention to provide a system for controlling a load directly connected to an actuator that is independent of nonuniformities in the output characteristic of an offset-tooth magnetic sensor.

SUMMARY OF THE INVENTION

In accordance with a principle of this invention, a new and improved direct-drive system is provided. The position and rate of movement of the shaft of an actuator is sensed by a magnetic sensor. Signals representing this information are compared with command signals generated by a command waveforms generator to control energy applied to the actuator so that synchronous/DC movement results.

In accordance with a further principle of this invention, the sensor is an offset-tooth magnetic sensor and the signals generated by the sensor are processed so that transition signals representing transitions between the processor outputs, as well as rate and position signals, are obtained. Transition signals modify command signals generated by a command waveforms generator in a predetermined manner, thereby resulting in smooth transitions occurring between the channels defined by the signals generated by the offset-tooth magnetic sensor.

In accordance with a further principle of this invention, the various comparison and control circuits used by the invention are formed of solid state logic components. In addition, the actuator is a DC torque motor driven by a brushless controller commutator.

It will be appreciated from the foregoing description that the invention provides an uncomplicated, light in weight and small in size direct-drive system suitable for use in various environments. Because electronic logic elements formed of solid state components and a brushless DC actuator are used, the invention is suitable for use in extreme and remote environments. In addition, because the system provides synchronous, multiple-loop feedback control with smooth channel transitions, various prior art problems heretofore discussed are overcome. More specifically, the snychronous/DC direct-drive system of this invention overcomes all the previously described disadvantages without impairing other desirable operating characteristics. The system yields brushless and direct-drive performance of a nature not previously available. Because the system is brushless, it can be utilized in remote environments where other systems cannot be used, such as on a space vehicle, for example.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings, wherein.

DESCRIPTION OF THE PREFERRED EMBODIMENT

Figure 1:
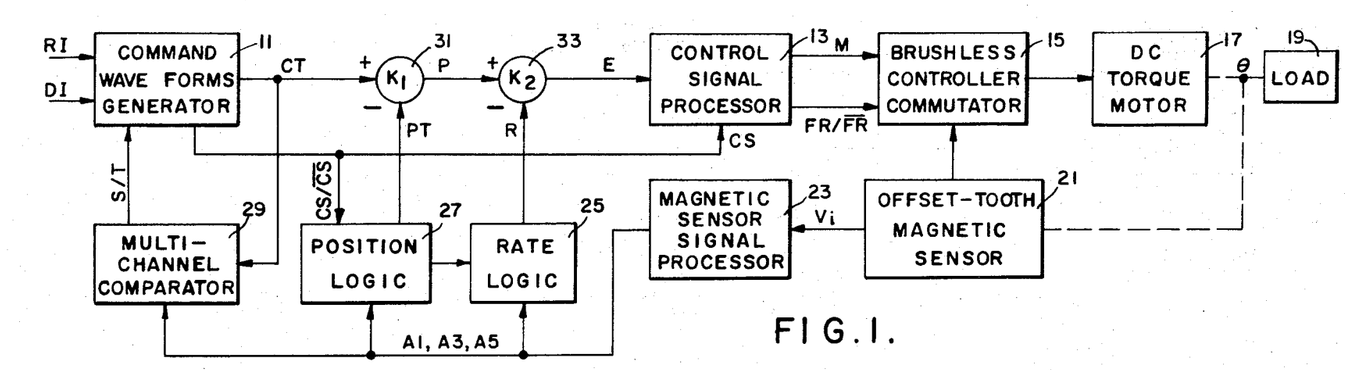
FIG. 1 is a block diagram illustrating a preferred embodiment of the invention.

FIG. 1 illustrates a preferred embodiment of the invention and comprises: a command waveforms generator 11; a control signal processor 13; a brushless controller-commutator 15; a DC torque motor 17; a load 19; an offset-tooth magnetic sensor 21; a magnetic sensor signal processor 23; a rate logic network 25; a position logic network 27; a multichannel comparator 29, and first and second difference amplifiers 31 and 33.

The command waveforms generator 11 provides the control system drive and synchronization waveforms. The offset-tooth magnetic sensor 21 provides continuous 360° coverage of piecewise-linear position and rate information derived directly from the output shaft and applies the information to both the controller-commutator 15 and the magnetic sensor signal processor 23. The magnetic sensor signal processor 23 combines the amplitudes of the magnetic sensor output signals into three signal channels of continuous position and rate information and applies the composite signals to the multichannel comparator 29, the position logic network 27 and the rate logic network 25.

The position logic network 27 gates successive outputs of the magnetic sensor signal processor to form a composite signal which is an essentially triangular function of the position of the output shaft. The multichannel comparator 29 provides smooth and continuous transitions between adjacent active channels in the position loop under all operative conditions. The rate logic network 25 converts the output of the magnetic sensor signal processor into a composite signal essentially proportional to the time derivative of the position logic output.

The control signal processor 13 processes the actuation error magnitude and direction signal to obtain proportional control for the brushless DC torque motor. The brushless controller-commutator 15 provides electronic commutation and controls the DC torque motor excitation. And, the DC torque motor 17 develops system control torques which are applied to the load 19.

The embodiment of the invention illustrated in FIG. 1 operates as a multiple-loop hybrid control system containing a position loop, a rate loop, and a channel-transition minor loop. The embodiment is a hybrid because it employs both analogue and digital signal processing to provide the resultant control system. The system actuator is a brushless DC torque motor comprised of the brushless controller-commutator 15 and the DC torque motor 17. The torque motor has performance characteristics similar to a conventional permanent magnet DC torque motor.

The angular position information required for electronic commutation and system control purposes is obtained directly from the output shaft of the DC torque motor using the single offset-tooth magnetic sensor 21. The offset-tooth magnetic sensor used in this illustrated embodiment of the invention has a stator-rotor relationship of the type illustrated on lines 1 and 2 of FIG. 2. More specifically, the stator portion of the sensor has six poles that provide six essentially analogue output signals of the type shown in lines $V1$ through $V6$ of FIG. 2 and, having low frequency gain characteristics for the four-pole rotor. Each sensor characteristic in the region from minimum to maximum low frequency gain is linearly related to the output shaft angular position and such linear regions occur for all shaft positions. The offset-tooth magnetic sensor thus provides a continuous 360° coverage of piecewise-linear shaft position and rate information suitable for use in direct-drive applications. A further description of an offset-tooth sensor suitable for use in the invention is described in U.S. Pat. application Ser. No. 656,953, entitled "Angular Position and Velocity Sensing Apparatus," by Leo J. Veillette, filed Jul. 28, 1967.

Figure 2:
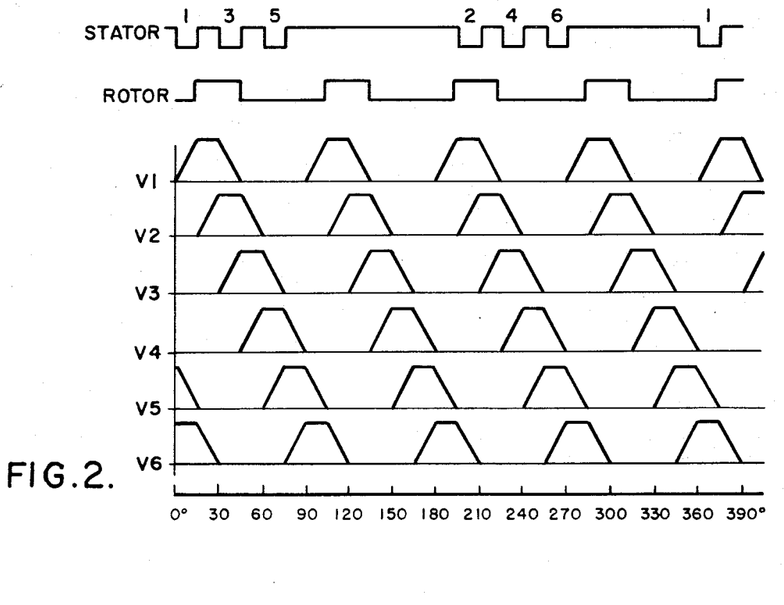
FIG. 2 is a waveform diagram illustrating the low-frequency gain characteristics of an offset-tooth magnetic sensor.
Figure 3:
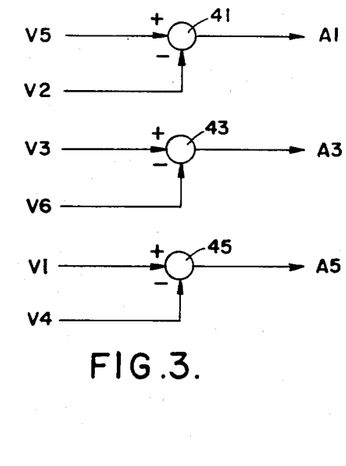
FIG. 3 is a block diagram of a magnetic sensor signal processor suitable for use in the embodiment of the invention illustrated in FIG. 1.

The six magnetic sensor signals $V1$ through $V6$ illustrated in FIG. 2 are combined in the magnetic sensor signal processor 23 to yield composite signals. A magnetic sensor signal processor 23, suitable for use in the embodiment of the invention illustrated in FIG. 1, is illustrated in FIG. 3 and comprises third, fourth, and fifth difference amplifiers 41, 43, and 45. The third difference amplifier 41 receives the $V5$ signal at its positive input terminal and the $V2$ signal at its negative input terminal. The output from the third difference amplifier 41 is designated A1. The fourth difference amplifier 43 receives the $V3$ signal at its plus input terminal and the $V6$ signal at its minus input terminal. The $V3-V6$ difference signal is designated A3. The fifth difference amplifier 45 receives the $V1$ signal at its plus input terminal and the $V4$ signal at its minus input terminal and generates a difference signal designated A5. Waveform diagrams for A1, A3, and A5 are all illustrated in FIG. 4. FIG. 5 illustrates the total operating range (dark lines) of the A1, A3 and A5 signals generated by the magnetic sensor signal processor. It should be observed from FIG. 5 that there is a linearity relationship over a range (dark lines) which is greater than the actual used range (also dark lines) illustrated in FIG. 4; hence, even if slight errors exist, linear operation is not harmed.

Only one channel is active for any given angular position of the output shaft, and each active section extends over a finite range of the output shaft angle. The magnetic sensor signal processor output in each active region is a continuous function of the output shaft angle so that the system has an essentially infinite angular resolution capability. The normal active regions for the A waveforms, under quasistationary, no-load conditions, combine in the position logic circuit to yield a PT composite output signal that is a continuous triangular function of shaft position. The signal is compared in the first difference amplifier 31 with a command-drive waveform signal CT generated as hereinafter described to produce an amplified position error signal P.

Figure 6:
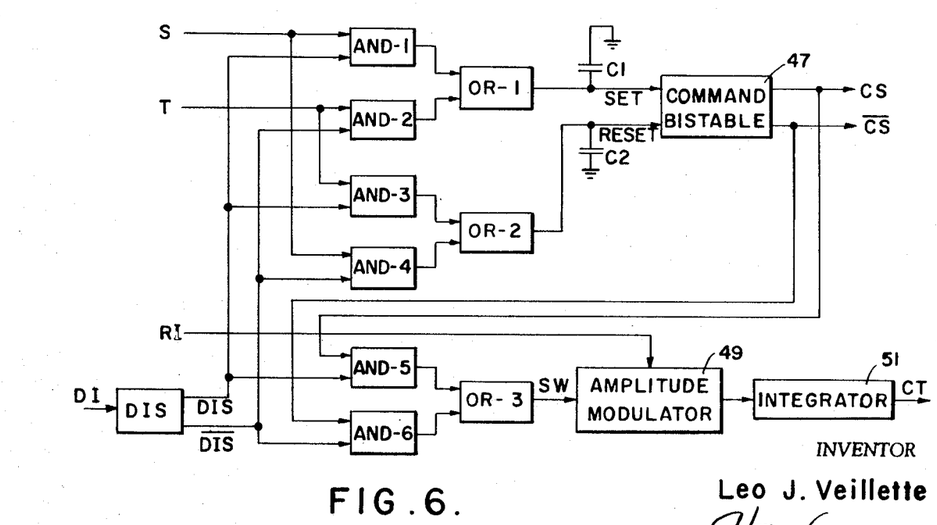
FIG. 6 is a block diagram of a command waveforms generator suitable for use in the embodiment of the invention illustrated in FIG. 1.

FIG. 6 illustrates a preferred embodiment of a command-waveforms generator 11 suitable for use in the embodiment of the invention illustrated in FIG. 1. The command waveforms generator illustrated in FIG. 6 comprises: a directional input schmitt trigger circuit designated DIS; six two-input AND gates designated AND-1, AND-2, AND-3, AND-4, AND-5, and AND-6; three two-input OR gates designated OR-1, OR-2, and OR-3; two capacitors designated C-1 and C-2; a command bistable multivibrator 47; an amplitude modulator 49, and an integrator 51. The command waveforms generator receives two external control signals designated $RI$ and $DI$. The $RI$ signal is a rate input signal and the $DI$ signal is a directional input signal. Hence, the command-waveforms generator receives signals that indicate a desired rate and direction of movement for the load shaft. Alternatively, only a rate input signal is applied if the directional input signal is appropriate. The command-waveforms generator also receives set ($S$) and reset ($T$) signals. The set and reset signals are derived from the multichannel comparator 29 and generated as hereinafter described. These signals are generated by the multichannel comparator when a channel transition change is required. That is, when it is desired to shift from one channel to another channel, the multichannel comparator generates an appropriate set or reset signal.

The S signal is applied to one input of AND-1 and one input of AND-4. The $T$ signal is connected to one input of AND-2 and one input of AND-3. The $RI$ signal is connected to the signal input of the amplitude modulator 49 and the $DI$ signal is connected to the input of $DIS$. $DIS$ generates a $DIS$ output and a $TS$ output and changes states when the input voltage crosses the switching threshold voltage level. $\overline{DIS}$ output is the complement of the $DIS$ output. The $DIS$ output of the $DIS$ circuit is connected to one input of AND-1, one input of AND-3, and one input of AND-5. The $\overline{DIS}$ output of $DIS$ is connected to one input of AND-2, one input of AND-4, and one input of AND-6.

The output of AND-1 is connected to one input of OR-1 and the output of AND-2 is connected to the second input of OR-1. The output of AND-3 is connected to one input of OR-2, and the output of AND-4 is connected to the second input of OR-2. The output of OR-1 is connected to the set input of the command bistable 47, and the output of OR-2 is connected to the reset input of the command bistable. C1 is connected between the set input of the command bistable and ground, and C2 is connected between the reset input of the command bistable and ground. C1 and C2 acts as filters to filter out any undesirable signals applied to the command bistable in a well-known manner.

Figures 8, 10:
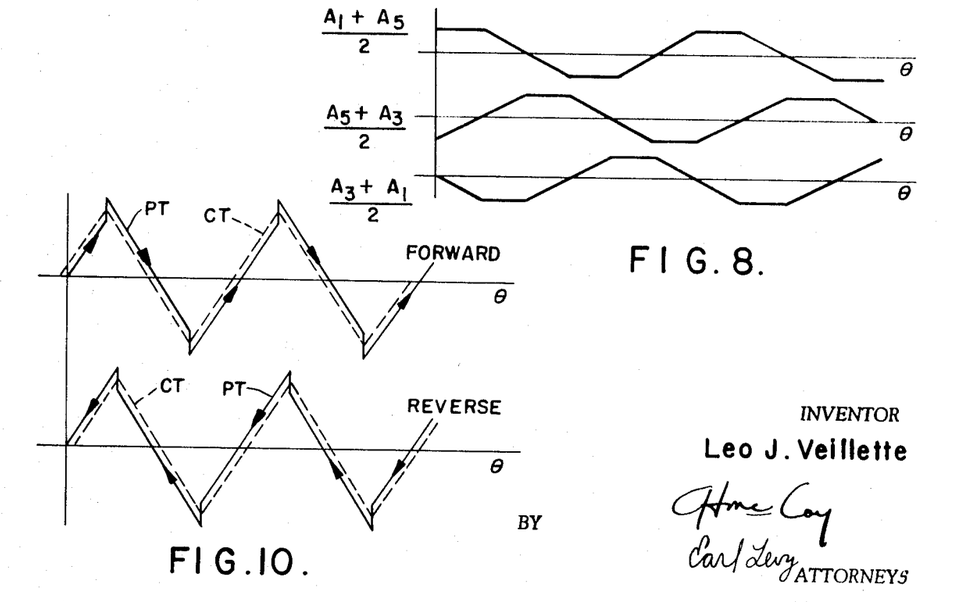
FIG. 8 is a waveform diagram illustrating the waveform of the outputs of an averaging network forming a portion of the multichannel comparator illustrated in FIG. 7.
FIG. 10 is a waveform diagram illustrating a command-triangle waveform and a shifted position-triangle waveform generated by the command waveforms generator and the position logic network under loaded conditions.

The command bistable generates a $CS$ output and a $\overline{CS}$ output with the $\overline{CS}$ output being the complement of the $CS$ output. Hence, if the $CS$ output is in the logical "1" state, then the $\overline{CS}$ output is in the logical "0" state and vice versa. The $CS$ output of the command bistable 47 is connected to the second input of AND-5, and the $\overline{CS}$ output of the command bistable is connected to the second input of AND-6. The outputs of AND-5 and AND-6 are connected to the two inputs of OR-3. The output of OR-3, which is a square wave signal ($SW$), is applied to the control input of the amplitude modulator 49. The output of the amplitude modulator 49 is connected through the integrator 51 to a $CT$ output terminal. It will be appreciated that by integrating the square wave output from the amplitude modulator, as modified by the rate input signal, a generally triangular wave with a controllable period is formed; hence, the $CT$ signal is a triangular signal which is desired, as will be appreciated from the previous description The $CT$ signal is illustrated in FIG. 10 and hereinafter described.

In general, as will be better understood by the following mathematical description of the operation of the invention, the command waveforms generator generates a $CT$ signal that, when combined with the signal generated by the position logic signal circuit, creates a position error signal that is utilized to control the movement of the actuator and load. The $S$ and $T$ signals are combined with the $DIS$ and $\overline{DIS}$ signals to control the command bistable 47, so that the command bistable shifts output states when a channel transition is necessary and shifts the control input to the amplitude modulator.

Figure 7:
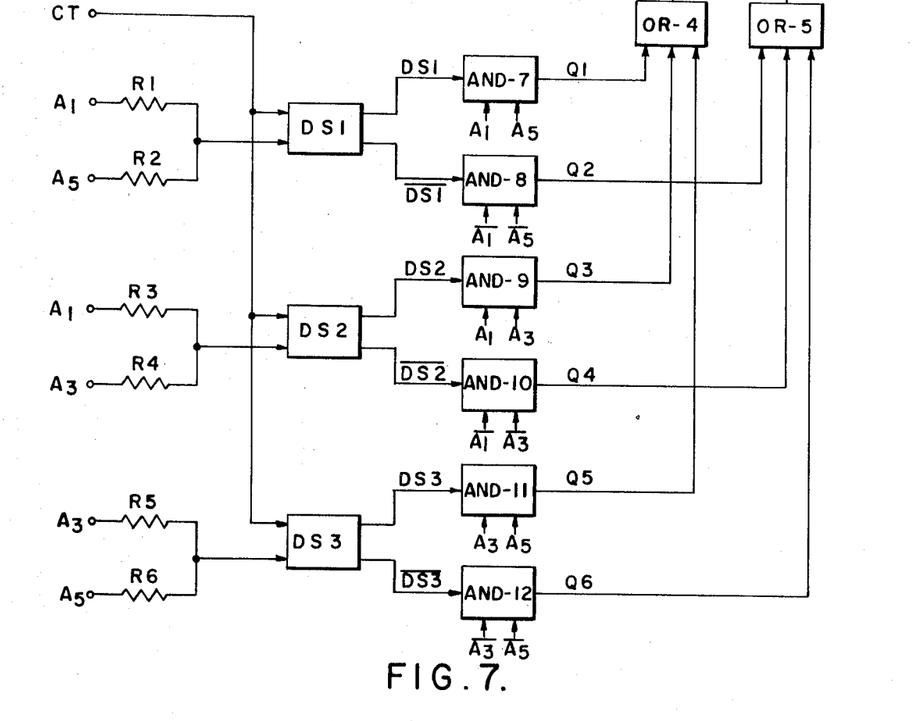
FIG. 7 is a block diagram of a multichannel comparator suitable for use in the embodiment of the invention illustrated in FIG. 1.

FIG. 7 illustrates a multichannel comparator suitable for use in the embodiment of the invention illustrated in FIG. 1 and comprises: six resistors, designated R1, R2, R3, R4, R5, and R6; three schmitt trigger circuits, designated DS1, DS2, and DS3; six three-input AND gates, designated AND-7, AND-8, AND-9, AND-10, AND-11, and AND-12; and two three-input OR gates, designated OR-4 and OR-5. One end of R1 is connected to the output of the magnetic sensor signal processor 23 to receive an $A$signal and one end of R2 is connected to the magnetic sensor signal processor to receive an $A5$ signal. The other ends of R1 and R2 are connected together and to one input of DS1. One end of R3 is connected to the magnetic sensor signal processor to receive an $a1$ signal and one end of R4 is connected to the magnetic sensor signal processor to receive an $A3$ signal. The other end of the R3 and R4 are connected together and to one input of DS2. One end of R5 is connected to the magnetic sensor signal processor to receive an $A3$ signal, and one end of R6 is connected to the magnetic sensor signal processor to receive an $A5$ signal. The other ends of R5 and R6 are connected together and to one input of DS3. DS1 and DS2 and DS3 also receive inputs by being connected to the CT output of the command waveforms generator illustrated in FIG. 6. DS1, DS2 and DS3 change output states when the difference signal input crosses the zero voltage level.

DS1 generates DS1 and $\overline{DS1}$ output signals, with the $\overline{DS1}$ output signal being the complement of the DS1 output signal. The DS1 output of DS1 is connected to one input of AND-7. AND-7 is also suitable connected to receive A1 and A5 signals from the magnetic sensor signal processor on its other two inputs, respectively. The output of AND-7 is designated Q1 and is connected to one input of OR-4. The $\overline{DS1}$ output of DS1 is connected to one input of AND-8. AND-8 also receives $\overline{A1}$ and $\overline{A5}$ input signals at its two other input terminals, respectively. $\overline{A1}$ and $\overline{A5}$ signals are created by passing the $A1$ and $A5$ signals from the magnetic sensor signal processor through suitable inverting means (not shown). The output of AND-8 is designated Q2 and is connected to one input of OR-5.

DS2 generates DS2 and $\overline{DS2}$ output signals. The DS2 output is connected to one input of AND-9. AND-9 also receives A1 and A3 input signals. The output of AND-9 is designated Q3 and is connected to the second input of OR-4. The $\overline{DS2}$ output signal is connected to one input of AND-10. AND-10 also receives $\overline{A1}$ and $\overline{A3}$ signals, the A3 signal being created in the same manner as described above in connection with the $A1$ and $A5$ signals. The output of AND-10 is connected to the second input of OR-5.

DS3 generates DS3 and $\overline{DS3}$ output signals. DS3 output is connected to one input of AND-11. AND-11 also receives $A3$ and $A5$ input signals. The output from AND-11 is designated Q5 and is connected to the third input of OR-4. The $\overline{DS3}$ output signal is connected to one input of AND-12. AND-12 also receives $\overline{A3}$ and $\overline{A5}$ input signals. The output of AND-12 is designated Q6 and is connected to the third input of OR-5. The output of OR-4 is designated $T$ and is connected to the $T$ input of the command-waveforms generator illustrated in FIG. 6. The output of OR-5 is designated S and is connected to the $S$input of the command-waveforms generator illustrated in FIG. 6.

In operation, the various $A$ composite signals are averaged in the resistive summing networks illustrated on the left of FIG. 7 and previously described. The waveforms of the summed outputs are as illustrated in FIG. 8 and are compared to the $CT$ voltage in the three $DS$ circuits. Preferably, the $DS$ circuits have zero hysteresis and change state when their difference inputs are at a zero voltage level. Hence, if the difference output of the $A1$ and $A5$ signal summer, and the $CT$ signal crosses zero, DS1 shifts its output state. The various DS outputs are applied via the appropriate AND gates to the $T$ and $S$ OR gates, designated in FIG. 7 as OR-4 and OR-5, respectively. The outputs of these OR gates are connected to control the command bistable 47 of the command waveforms generator illustrated in FIG. 6. The command bistable is in the "set" state for a signal applied to its set input only, and is the "reset" state for a signal applied to its reset input only. The command bistable has sufficient hysteresis to maintain a given state when both input signals ($S$ and $T$) are removed. Hence, in essence, the multichannel comparator compares the command ($CT$) signal with the various averaged magnetic sensor signal processor signals and generates signals ($S$ or $T$) when a channel transition change is necessary. The transition condition is essentially independent of the relative signal amplitudes between the output channels of the magnetic sensor signal processor.

Figure 9:
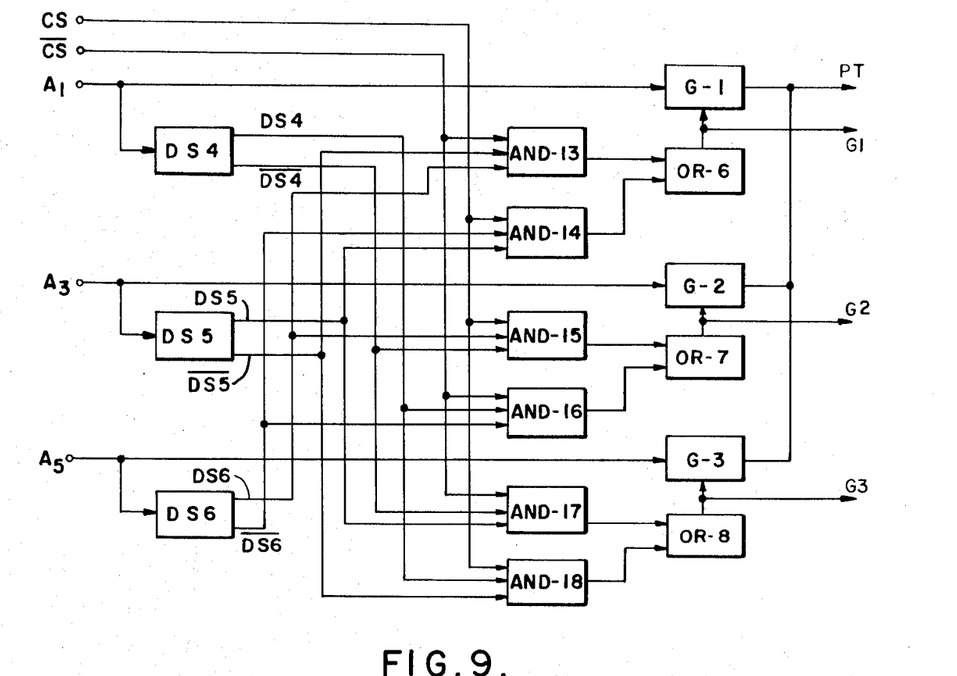
FIG. 9 is a block diagram of a position logic circuit suitable for use in the embodiment of the invention illustrated in FIG. 1.

The $CS$ and $\overline{CS}$ output signals from the command bistable of the command-waveforms generator and the $A1$, $A3$ and $A5$ outputs from the magnetic sensor signal processor 23 are combined in the position logic circuit 27. A position logic circuit suitable for providing the appropriate combination is illustrated in FIG. 9 and comprises: three schmitt trigger circuits designated DS4, DS5, and DS6; six three-input AND gates designated AND-13, AND-14, AND-15, AND-16, AND-17, and AND-18; three two-input OR gates designated OR-6, OR-7, and OR-8, and three analogue gates designated G-1, G-2, and G-3.

The $CS$ output of the command-waveforms generator's command bistable 47 is connected to one input of AND-14, AND-15, and AND-18. The $\overline{CS}$ output of the command bistable 47 is connected to one input of AND-13, AND-16, and AND-17. The $A1$ output of the magnetic sensor signal processor is connected to one input of G-1 and the input of DS4. The $A3$ output of the magnetic sensor signal processor is connected to one input of G-2 and the input of DS-5. And, the $A5$ output of the magnetic sensor signal processor is connected to one input of G-3 and the input of DS6.

Each schmitt trigger generates DS and $\overline{DS}$ outputs which are complements of one another. The DS4 output is connected to the second input of AND-16 and the second input of AND-18. The $\overline{DS4}$ output is connected to the second input of AND-15 and the second input of AND-17. The $\overline{DS5}$ output is connected to the second input of AND-14 and the third input of AND-17. The DS5 output is connected to the second input of AND-13, and the third input of AND-18. The $\overline{DS6}$ output is connected to the third input of AND-13 and the third input of AND-15. The DS6 output is connected to the third input of AND-14 and the third input of AND-16.

The outputs of AND-13 and AND-14 are connected to the two inputs, respectively, of OR-6. The outputs of AND-15 and AND-16 are connected to the two inputs, respectively, of OR-7. The outputs of AND-17 and AND-18 are connected to the two inputs, respectively, of OR-8. The output of OR-6 is connected to the second input of G-1; the output of OR-7 is connected to the second input of G-2; and the output of OR-8 is connected to the second input of G-3. The outputs of G-1, G-2, and G-3 are connected together to an output terminal designated PT, which is connected to the second input of the first difference amplifier 31, illustrated in FIG. 1. The output of OR-6 is designated G1 and connected to an output terminal. The output of OR-7 is designated G2 and is connected to a further output terminal, and the output of OR-8 is designated G3 and connected to a still further output terminal. All of these output terminals are connected to input terminals of the rate logic circuit illustrated in FIG. 11 and hereinafter described.

The DS schmitt circuits, illustrated in FIG. 9 preferably, have zero hysteresis and change state when input signals applied to them cross zero. The various OR and AND gates gate the appropriate A signal channels to yield an essentially triangular output voltage PT (FIG. 10) that is dependent on the output shaft angular position. More specifically, the heavy lined sections of the A waveforms illustrated in FIG. 4 correspond to the active regions of operation under no-load, quasistationary conditions, and when combined, yield a PT composite signal that is a continuous triangular curve. Under load conditions the shaft angle is slightly lagging and the active segments of the A waveforms are shifted slightly so as to generate a PT waveform of the type illustrated in FIG. 10. That is, under no-load, quasistationary conditions the PT waveform is triangular; whereas, under loaded condition, the PT waveform is shifted to form a generally triangular wave (but not exactly triangular) of the type illustrated in FIG. 10. This shift causes a transition between channels to occur in a manner that is smooth and continuous with respect to the torque developed for all angular positions of the output shaft. Further, hysteresis in the command bistable switching characteristic prevents hunting between two adjacent channels.

Figure 11:
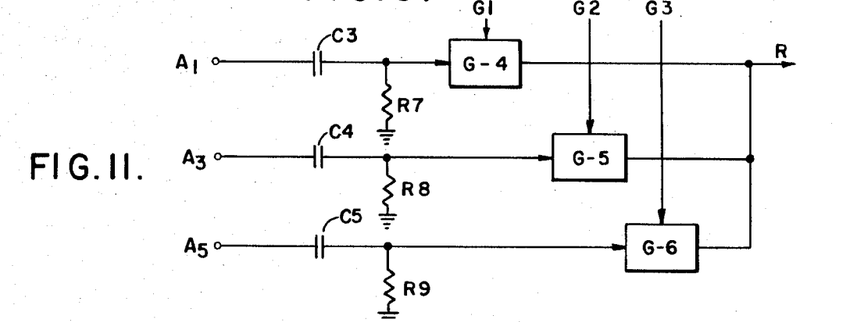
FIG. 11 is partially schematic and partially block diagram of a rate logic circuit suitable for use in the embodiment of the invention illustrated in FIG. 1.

The outputs of the magnetic sensor signal processor are differentiated by the rate logic circuit and gated by the G outputs of the position logic circuit to create a composite rate signal ($R$) that is proportional to the time derivative of the position logic output. A rate logic circuit suitable for performing these functions is illustrated in FIG. 11 and comprises three capacitors designated C3, C4, and C5; three resistors designated R7, R8 and R9; and, three analogue gates designated G-4, G-5, and G-6.

The A1 signal from the magnetic sensor signal processor 23 is connected through C3 to the analogue input of G-4. The junction between C3 and the analogue input of G-4 is connected through R7 to ground. The gate input of G-4 is connected to the G1 output of the position logic circuit 27. The $A3$ output of the magnetic sensor signal processor is connected through C4 to the analogue input of G-5. The junction between C4 and the analogue input of G-5 is connected through R8 to ground. The gate input of G-5 is connected to the G2 output of the position logic circuit. The $A5$ output of the magnetic sensor signal processor is connected through C5 to the analogue input of G-6. The junction between C5 and the analogue input of G-6 is connected through R9 to ground. The gate input of G-6 is connected to the G3 output of the position logic 27. The outputs of G-4, G-5, and G-6 are connected together and to the negative input of the second difference amplifier 33 (FIG. 1).

It will be appreciated from the foregoing description that C3 and R7, C4 and R8, and C5 and R9 each forms a differentiating network for differentiating the $A1$, $A3$, and $A5$ signals, respectively. The appropriate differentiated signal is gated by G-4, G-5 or G-6 to form the desired rate signal ($R$) which is applied to the second difference amplifier 33, illustrated in FIG. 1. This signal is combined with the position signal ($P$), generated when $CT$ is combined with $PT$ in the first difference amplifier 31, to provide a resultant error signal ($E$) that is applied to the control signal processor 13. The control square wave ($CS$) signal from the command bistable and the error signal ($E$) from the second difference amplifier are processed by the control signal processor 13 to provide the torque magnitude and direction control signals $M$ and $FR/\overline{FR}$, respectively. These signals control the movement of the actuator and load shaft so that the desired shaft position is achieved.

Figure 12:
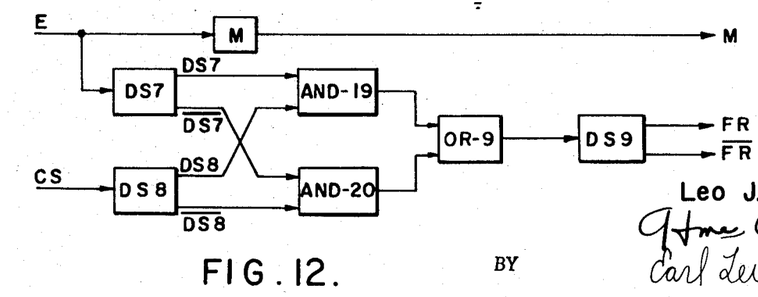
FIG. 12 is a block diagram of a control signal processor suitable for use in the embodiment of the invention illustrated in FIG. 1.

A control signal processor suitable for processing these signals in this manner is illustrated in FIG. 12 and comprises: an absolute value circuit, designated $M$, which generates an output signal that is the absolute value of its input signal; three schmitt circuits designated DS7, DS8, and DS9; two two-input AND gates designated AND-19 and AND-20; and, a two-input OR gate designated OR-9. The $E$ output of the second difference amplifier 33 is connected to the input of DS7 and the input of $M$. The output of $M$ is an absolute value (magnitude) signal that is applied to the brushless controller commutator 15 to control the magnitude of power applied to the commutator which in turn controls the magnitude of the torque developed by the shaft of the DC torque motor. The DS7 output of DS7 is connected to one input of AND-19. The $\overline{DS7}$ output of DS7 is connected to one input of AND-20. The input of DS8 is the CS output of the command waveforms generator 11, illustrated in FIG. 6. The DS8 output is connected to the second input of AND-19. The $\overline{DS8}$ output is connected to the second input of AND-20. The outputs of AND-19 and AND-20 are connected to the two inputs of OR-9, respectively. The output of OR-9 is connected to the input of DS9. DS9 generates directional $FR$ and $\overline{FR}$ output signals which are applied to the brushless controller commutator to control the direction of shaft movement. The schmitt circuits DS7 and DS8 generate output signals in accordance with their input signals, i.e., when an input signal E or CS crosses a zero voltage level DS7 or DS8, as appropriate, changes output states. The status of the output states is interpreted by AND-19, AND-20 and OR-9 and used to control the state of DS9.

Turning now to a theoretical description of the operation of the invention, the performance characteristics of the brushless DC torque motor with torque/speed control can be expressed by the relation: (1) $\quad K_3 \tau + K_4 \theta = (FR\overline{FR})M$ where $\tau$ = electromagnetic control torque
$\theta$ = shaft speed $FR$ = forward/reverse direction voltage (logical 1 corresponds to forward, and logical 0 corresponds to reverse)

$\overline{FR}$ = logical complement of forward/reverse direction voltage $M$ = magnitude of control voltage and $K_3, K_4$ = constants dependent on the torque motor and electronic controller-commutator parameters. Equation (1) is a real expression in which the logical 1 and 0 values of $FR$ and $\overline{FR}$ are defined to equal unity and zero respectively in the real number system. $M$ is an analogue input equal to the magnitude of the amplified actuation error, $E$.

The angular position information required for electronic commutation and system control purposes is obtained directly from the output shaft using the single offset-tooth magnetic sensor 21. The sensor provides as seen from FIG. 2 six essentially analogy signals with low frequency gain characteristic. Each sensor characteristic in the region from minimum to maximum low frequency gain is linearly related to the output shaft angular position, and such linear regions occur for all shaft positions. The offset-tooth sensor thus provides continuous, 360° coverage of piecewise-linear shaft position and rate information suitable for use in direct-drive applications.

Figure 4:
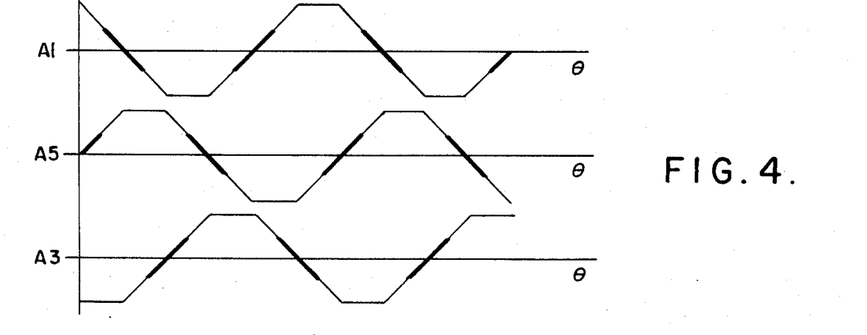
FIG. 4 is a waveform diagram illustrating the waveforms of the output signals from the magnetic sensor signal processor.
Figure 5:
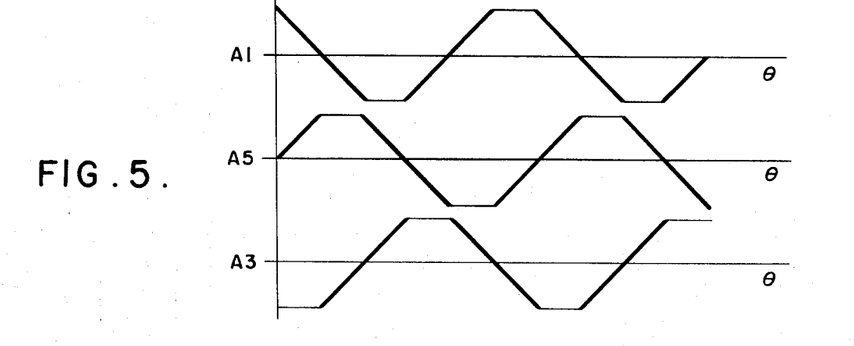
FIG. 5 is a waveform diagram illustrating the operating range of the output signals from the magnetic sensor signal processor.

The six magnetic sensor signal amplitudes, $V1$ through $V6$ of FIG. 2, are combined in the magnetic sensor signal processor 23 to yield the composite signals, $A$, illustrated in FIG. 4. The position logic circuit 27 gates one of the three magnetic sensor signal processor outputs as the active channel, and the active output signal, $PT$, is compared to the commanded drive waveform, $CT$, to produce the amplified system position error signal, $P$. The position loop operates to drive this error signal to a null, thus providing a position control capability.

The heavy-lined sections of the $A$ waveforms correspond to the normal active regions of operation under quasistationary, no-load conditions. These are essentially conditions under which the angular rate, $\theta$, of the output shaft is sufficiently slow that $R = 0$, and under which the electromagnetic torque is sufficiently small that $\tau = 0$. The active regions are selected to lie along the linearly rising and linearly falling portions of the magnetic sensor signal processor outputs, so that for any given channel (2)   $PT = K_6$ where $K_5, K_6$ are arbitrary constants depending on the channel selected, with $K_5$ positive for rising active regions and negative for falling active regions.

Only one channel is active for any given angular position of the output shaft and each active section extends over a finite range of the output shaft angle. The magnetic sensor signal processor output in each active region is a continuous function of the output shaft angle so that the system has an essentially infinite angular resolution capability. The normal active regions of the $A$ waveforms, under quasistationary, no-load conditions, combine to yield $PT$ as a continuous triangular function of shaft position.

It is of course necessary that system operation be stable in the vicinity of a particular null for all angular positions of the output shaft. The conditions required for stable equilibrium are established as follows:

(3)   $\dot{P} = K_1 (cT\,PT), 1$ (4)   $e = K_2 (p-R)$ (5)   $M = |E|$

At null ($CT = PT$), under essentially stationary conditions ($R = 0, CT = CT_0$), equations (1) through (5) combine to give (6)   $K_3 \tau = (FR - \overline{FR}) |E|$ and (7)   $E = -K_1 K_2 K_5 (\theta - \theta_0)$ where the 0 subscripts denote the values at null. A stable equilibrium at null requires that (8)   $\tau(\theta - \theta_0) < 0$ which states that the torque $\tau$ must be in the direction required to correct the displacement error. Substituting from equations (6) and (7) into (8) and noting that $K_1, K_2, K_3$ are positive, the following equation is obtained:

(9)   $(FR - \overline{FR}) FK_5 > 0$ where   $K_5 = \dfrac{d(PT)}{d\theta}$ is positive or negative, depending on which of the magnetic sensor signal processor output channels is active. Condition (9) is satisfied by the logical relations (10)   $FR = E \cdot \overline{(CS)} +$ and (11)   $\overline{FR} = E \cdot \overline{(CS)} + \overline{E} \cdot {}^\prime CS)$ where (12 where           logical $E = 1$, for analogue $E > 0$ (13)           logical $E = 0$, for analogue $E < 0$ (14)                $CS = 1$, for $K_5 > 0$ (15)                $CS = 0$, for $K_5 < 0$ Relations (14) and (15) require that the commanded square wave $CS$ and the position logic output waveform $PT$ be synchronized. Equations (10) and (11) are designed into the control signal processor (FIG. 12) so that stable equilibrium conditions exist at null for all angular positions of the output shaft.

In addition to a stable null, it is necessary that the transition between active channels be smooth and continuous under all operating conditions. This is accomplished in the channel-transition loop by comparing the commanded drive waveform, $CT$, with the magnetic sensor signal processor outputs and gating the position loop from one active channel to the next when the channel transition conditions are satisfied. These conditions are obtained by recognizing that under nonstationary and loaded conditions the angular rate, $\theta$, the rate signal, $R$, and the torque, $\tau$, are nonzero, so that the following equations apply at the transition point, (16)       $K_3 \tau_1 + K_4 \theta_1 = (FR - \overline{FR})_1 M_1$ $K_3 \tau_2 + K_4 \theta_2 = (FR - \overline{FR})_2 M_2$ (17)       $M_1 = |E_1|, M_2 = |E_2|$ (18)       $P_1 = K_1(CT_1 - PT_1), P_2 = K_1(CT_2 - PT_2)$ (19)       $\dot{E}_1 = K_2(P - R_1), E_2 = K_2 P_2 - R_2)$ (20)       $R_1 = -R_2$ (21)       $CT = CT_1 = CT2,$ where the 1 subscripts denote values immediately prior to the transition and the 2 subscripts denote values immediately after the transition. Smooth and continuous operation requires that the motor torque and angular rate be continuous at the transition point so that equations (16) give (22)       $M_1 = M_2$ and (23)       $(FR - \overline{FR})_1 = (FR - \overline{FR})_2$ Solving equations (17) through (22), the following equation is obtained:

(24)       $K_1 [(1 \mp 1) CT - (PT_1 \mp PT_2)] = (1 \pm 1) R_1$

Selecting the lower symbols, the following equation is obtained:

(25)

$$CT = \dfrac{PT_1 + PT_2}{2}$$

where the subscripts 1 and 2 are now interpreted as two adjacent active channels. Hence, this is a channel-transition condition equation.

The outputs of the magnetic sensor signal processor are summed according to the right side of equation (25) to give the "average" waveforms of FIG. 8. The commanded drive waveform, $CT$, is compared with the "average" waveforms in the multichannel comparator so that an output signal $S/T$ is developed whenever the commanded waveform is equal to the active "average" waveform, as required by equation (25). The comparison operation is performed in the vicinity of the midpoint on the flat portions of the active "average" waveform. One and only one flat region occurs for every angular position of the output shaft, so that for any given shaft position only one region is active.

It is desirable that system operation not switch alternately between adjacent active channels in the vicinity of the transition point, but rather, once a transition has occurred from one active channel to the next, operation should remain on the second channel. This is done by making the operating range of each active channel cover an extended linear segment of the magnetic sensor signal processor output waveforms, as shown in FIG. 5. Such a design requires a memory function in the commanded square wave generator, since the $CS$ output is then a function of the previous transition only, and not of the present state of the system. The required memory is provided by the logical relation:

(26) $\quad S^1 = (CS) \cdot {}'(S^1 + T^1)$ and (27) $\quad S^1 T^1 = 0$ where $CS$ = memory output
$S^1$ = memory set input
$T^1$ = memory reset input and where the memory retains its last state when both input signals are removed. For forward direction operation the $CS$ output from the memory must switch to the 1 state for channel-transitions occurring at negative values of the $CT$ waveform, and to the 0 state for channel-transitions at positive values. The $S$ input is therefore triggered when the $CT$ waveform has a negative amplitude and the $T$ input is triggered when $CT$ has a positive amplitude. The opposite inputs are triggered for reverse direction operation. The logical relations required to steer the $S/T$ outputs from the multichannel comparator to the appropriate memory input for both forward and reverse directions of operation are given by (28) $\quad S^1 = (DIS) \cdot S + (\overline{DIS}) \cdot T$ and (29) $\quad T^1 = (DIS) \cdot T + (\overline{DIS}) \cdot S$ where $DIS$ corresponds to the direction input $DI$ (FIG. 6) to the system and equals logical 1 for forward direction operation and equals logical 0 for reverse operation. Equations (26) through (29) combine to give the logical output $CS$ of the command-waveform generator in terms of the logical inputs, as (30) $\quad (CS) \cdot {}'(S+T) = (DIS) \cdot S + (\overline{DIS}) \cdot T$ and (31) $\quad S \cdot T = 0$ Position control is achieved by comparing the commanded drive waveform, $CT$, to the position logic output, $PT$, in the difference amplifier, $K_1$, and driving the error signal to a null. The commanded drive signal $CT$ can be practically any waveshape, such as triangular, sinusoidal, stepped, sawtooth, parabolic, etc., depending on the control desired. If the amplitudes of the drive waveform $CT$ are always maintained within the limits of the multichannel comparator average waveforms, the channel-transition conditions are not satisfied and operation is restricted to the angular range of a single active segment of the position logic output $PT$. If, however, the amplitude of the $CT$ waveform exceeds the amplitude of the active multichannel comparator "average" waveform, operation switches to the adjacent active channel. If the $CT$ waveform is periodic and the successive positive and negative amplitudes of $CT$ exceed the corresponding positive and negative active segments of the "average" waveforms, transitions from one active channel to the next occur in sequence so that unrestricted angular rotation of the output shaft is achieved. Under these conditions the periodic $CT$ time waveform is synchronized with the periodic $PT$ space waveform so that rate control is obtained by controlling the frequency of the commanded waveform $CT$. The period of $CT$ can vary over a wide range and can be made indefinitely long without loss of synchronization so that a wide range of rate control is achieved, down to indefinitely slow speeds.

The direction of shaft rotation depends on the relative algebraic signs of the slopes of the $CT$ time waveform and the $PT$ space waveform. Hence, (32) $\quad \dfrac{d(CT)}{dt} \dfrac{d(PT)}{d\theta} > 0,$ for forward direction operation and (33) $\quad \dfrac{d(CT)}{dt} \dfrac{d(PT)}{d\theta} < 0,$ for reverse direction operation These conditions are depicted in FIG. 10 for the case of a commanded triangular waveform. The command waveforms generator is designed with square wave $SW$ in fixed time-phase with drive signal $CT$, so that (34) $\quad SW = 1, \text{ for } \dfrac{d(CT)}{dt} > 0$ and (35) $\quad SW = 0, \text{ for } \dfrac{d(CT)}{dt} < 0$ Recalling from (14) and (15) that the $CS$ waveform is synchronized in fixed space-phase with the position logic output, $PT$, (32) and (33) are satisfied by the logic relation (36) $\quad SW = (\overline{DIS}) \cdot {}'CS) + (\overline{DIS}) \cdot {}'CS)$ Electronic damping of the system is achieved in the rate-loop by subtracting from the amplified position error $P$, a rate signal $R$, which is proportional to the time derivative of the position logic output $PT$. Hence, $$R = K_7 \dfrac{d(PT)}{dt} = K_7 \dfrac{d(PT)}{d\theta} \dfrac{d\theta}{dt}$$

(37) $\quad R = K_5 K_7 \dfrac{d\theta}{dt}$ so that the rate signals in adjacent active channels are of opposite algebraic sign for a given direction of rotation, since $K_5$ is of opposite sign in adjacent channels.

The condition that must be satisfied for system damping is (38) $\quad \tau \gamma \dfrac{d\theta}{dt} < 0$ which states that the rate-dependent component, $\tau\gamma$, of applied torque must be opposite to the direction of shaft rotation. To show that condition (38) is satisfied, equations (1), (5), (10), and (11) are combined to give $K_3 \tau + K_4 \theta = (E - \overline{E}) |E|$, for $CS = 1$ and $K_3 \tau + K_4 \theta = -(E - \overline{E}) |E|$, for $CS = 0$ Applying relations (120) and (13), these equations become (39) $\quad K_3 \tau + K_4 \theta = E,$ for $CS = 1$ and (40) $\quad K_3 \tau + K_4 \theta = -E,$ for $SC = 0$ Resolving the applied torque, $\tau$, into its rate-dependent and other components, $\tau\gamma$ and $\tau_0$, respectively, to give (41) $\quad \tau = \tau\gamma + \tau_0$ and substituting from (4) and (41) into (39) and (40), the following equations are obtained:

$K_3 (\tau_0 + \tau\gamma) + K_4 \theta = K_2 (P - R),$ for $CS = 1$ and $K_3 (\tau_0 + \tau\gamma) + K_4 \theta = -K_2 (P - R),$ for $CS = 0$ Equating the rate-dependent terms only, and substituting from (37) results in:

$K_3 \tau = -(K_4 + K_2 K_5 K_7) \theta,$ for $CS = 1$ and $K_3 \tau\gamma = -(K_4 - K_2 K_5 K_7) \theta,$ for $CS = 0$ Recalling that $K_5 > 0$ for $CS = 1$, and $K_5 < 0$ for $CS = 0$, the above equations can be combined into the single equation:

(42) $\quad K_3 \tau\gamma = -(K_4 + K_2 K_7 |K_5|) \theta$

It follows immediately that (43) $\quad \tau\gamma\theta = -\dfrac{1}{K_3} (K_4 + K_2 K_7 |K_5|) \theta^2 < 0$ so that condition (38) is satisfied and controlled electronic damping of the system is achieved for all angular positions of the output shaft.

The discussion to this point has dealt exclusively with operation in the synchronous mode. However, the system also operates in a DC mode under conditions where the drive waveform CT is commanded outside of the synchronous range, defined by (44) $(A\alpha)_{min} < CT < (A\alpha)_{max}$, where $A\alpha = A_1, A_3$ or $A_5$ Consider the case where $CT > (A\alpha)_{max}$ with direction input $DI = 1$. Trigger signals from the multichannel comparator then occur only at the $T$ output so that the command waveforms generator memory bistable does not switch between states, but maintains a constant output at $CS = 0$. Under these conditions the entire negative-sloping linear segments ($K_5 < 0$) of each $A\alpha$ waveform are active regions of operation, and the positive-sloping segments remain inactive. Combining equations (4), (37), and (40), and applying the condition $K_5 < 0$, the following equation is obtained:

(45) $K_3\tau\dot\gamma + (K_4 + K_2K_7 |K_5|)\theta = -K_2P$

This equation has the same form as that of a conventional DC rate-control system where $(-P)$ corresponds to the commanded rate signal. Since $CT > (A\alpha)_{max} > PT$ from equation (3), it can be seen that $P > 0$ so that a unidirectional negative commanded input is applied. Note that both the stall torque and no-load speed are in the reverse direction.

Equation (45) also applies to the case where $DI = 0$ and $CT < (A\alpha)_{min}$, only now $CT < (A\alpha)_{min} < PT$ so that $P < 0$ and a unidirectional positive commanded input is applied. Both the stall torque and no-load speed are then in the forward direction.

In a similar manner, the following equation is obtained:

(46) $K_3\tau + (K_4 + K_2K_7 |K_5|)\theta = K_2P$ for the cases where $DI = 1$ and $CT > (A\alpha)_{min}$, and $DI = 0$ and $CT > (A\alpha)_{max}$. From equation (3) $p < 0$ for $CT < (A\alpha)_{min}$, so that operation is in the reverse direction, and $P > 0$ for $CT > (A\alpha)_{max}$ so that operation is in the forward direction.

It follows from the above results that the direction of shaft rotation in the DC mode is controlled by the commanded direction input, $DI$, and does not depend on whether $CT > (A\alpha)_{max}$ or $CT < (A\alpha)_{min}$. The direction of rotation is opposite to the commanded direction in the synchronous mode.

It can be seen from the foregoing mathematical description that the apparatus of the invention, heretofore described, provides a direct-drive system that operates in a synchronous or DC mode. The use of a plurality of loops to control position and rate of movement, as well as channel transition changes, results in a system that operates smoothly and continuously at high or low speeds.

I claim:

1. A synchronous/DC direct-drive system comprising:
   an actuator adapted for connection to the shaft of a load;
   sensing means for sensing the position and rate of movement of the shaft of said load and for generating a plurality of signals representing said position and rate of movement;
   signal processing means connected to said sensing means for processing said plurality of signals generated by said sensing means into composite output signals which provide continuous position and rate information; and
   control means, adapted to receive external control signals, connected to said signal processing means and to said actuator for interpreting said composite output signals and said external control signals and for generating actuator drive signals in accordance therewith.

2. A synchronous/DC direct-drive system as claimed in claim 1, wherein said signal processing means includes:
   a sensor signal processor connected to said sensing means; and
   a multichannel comparator connected to said sensor signal processor and to said control means for interpreting the signals generated by said sensor signal processor and said control means and for generating channel transition information signals.

3. A synchronous/DC direct-drive system as claimed in claim 1, wherein said sensing means is a magnetic sensor and said signal processing means includes a magnetic sensor signal processor connected to said magnetic sensor.

4. A synchronous/DC direct-drive system as claimed in claim 1, wherein said sensing means is an offset-tooth magnetic sensor.

5. A synchronous/DC direct-drive system as claimed in claim 4, wherein said signal processing means also includes a magnetic sensor signal processor connected to said offset tooth magnetic sensor and a multichannel comparator connected to said magnetic sensor signal processor and to said control means for interpreting the signals generated by said magnetic sensor signal processor and said control means and for generating channel transition information signals.

6. A synchronous/DC direct-drive system as claimed in claim 5, wherein said signal processing means also includes:
   a position logic circuit connected to said magnetic sensor signal processor to receive the signals generated by said magnetic sensor signal processor and to said control means to receive control signals; and
   a rate logic circuit connected to said position logic circuit and to said magnetic sensor signal processor to receive signals generated by said position logic circuit and said magnetic sensor signal processor.

7. A synchronous/DC direct-drive system as claimed in claim 6, wherein said control means includes:
   a command waveforms generator, adapted to receive said external control signals and connected to said multichannel comparator to receive signals generated by said multichannel comparator, for generating command and control signals; and
   a control signal processor connected to said command waveforms generator to receive signals generated by said command waveforms generator, to said position logic circuit to receive signals generated by said position logic circuit and to said rate logic circuit to receive signals generated by said rate logic circuit, said control signal processor also connected to said actuator for controlling the actuation of said actuator.

8. A synchronous/DC direct-drive system as claimed in claim 7, wherein said control means also includes:
   a first difference amplifier having one input connected to the output of said command waveforms generator and a second input connected to the output of said position logic circuit; and
   a second difference amplifier having one input connected to the output of said first difference amplifier and a second input connected to the output of said rate logic circuit and having its output connected to the input of said control signal processor.

9. A synchronous/DC direct-drive system comprising:
   a DC torque motor;
   an offset tooth magnetic sensor mounted so as to sense the position and rate of movement of the shaft of said DC torque motor and generate signals related to said position and rate of movement;
   a magnetic sensor signal processor connected to receive the signals generated by said offset tooth magnetic sensor and process them in a predetermined manner;
   a command waveforms generator for generating command and control signals, said command waveforms generator being adapted to receive externally generated rate and direction control signals;
   a multichannel comparator connected to the output of said magnetic sensor signal processor, for receiving the signals generated by said magnetic sensor signal processor, and connected to said command waveforms generator, to receive command signals, said multichannel comparator having a set and reset output connected to said command waveforms generator so as to apply a set and reset signal to said command waveforms generator when a predetermined set of input conditions are received at the inputs of said multichannel comparator;
   a position logic circuit connected to the output of said magnetic sensor signal processor for receiving the signals generated by said magnetic sensor signal processor and connected to receive the control signals generated by said command waveforms generator, said position logic circuit generating a position signal at a position output terminal;

a rate logic network connected to said magnetic sensor signal processor to receive the signals generated by said magnetic sensor signal processor and to said position logic circuit to receive signals generated by said position logic circuit, said rate logic circuit generating a rate signal at a rate output terminal;

a first difference amplifier having one input connected to receive the command signals generated by said command waveforms generator and a second input connected to the position output terminal of said position logic circuit;

a second difference amplifier having one input connected to the rate output terminal of said rate logic circuit and a second input connected to the output of said first difference amplifier;

a control signal processor having one input connected to receive the control signals generated by said command waveforms generator and a second input connected to the output of said second difference amplifier; and a brushless controller commutator connected to said control signal processor to receive magnitude and direction of signals and connected to said DC torque motor to control the movement of the shaft of said DC torque motor.

10. A synchronous/DC direct-drive system as claimed in claim 9, wherein said magnetic sensor signal processor is formed of a plurality of difference amplifiers.

11. A synchronous/DC direct-drive system as claimed in claim 10, wherein said command waveforms generator comprises a memory circuit and a plurality of logic elements adapted to receive generated set and reset signals.

12. A synchronous/DC direct-drive system as claimed in claim 11, wherein said multichannel comparator comprises a plurality of schmitt circuits and a plurality of logic elements adapted to sense the signals generated by said magnetic sensor signal processor and a control signal generated by said command waveforms generator and to generate set and reset signals for controlling said command waveforms generator when a predetermined set of conditions occurs.

13. A synchronous/DC direct-drive system as claimed in claim 11, wherein said position logic circuit is formed of a plurality of logic elements and analogue gates and wherein said rate logic circuit is formed of a plurality of logic elements and analogue gates.

14. A synchronous/DC direct-drive system as claimed in claim 13, wherein said control signal processor is formed of a plurality of logic elements adapted to sense an error signal generated by said second difference amplifier and a control signal generated by said command waveforms generator and to generate magnitude and direction signals.